United States Patent
Cheng et al.

(10) Patent No.: US 10,616,941 B2
(45) Date of Patent: Apr. 7, 2020

(54) METHOD, ELECTRONIC APPARATUS AND RECORDING MEDIUM FOR ESTABLISHING WIRELESS CONNECTION THROUGH VIBRATION

(71) Applicant: HTC Corporation, Taoyuan (TW)

(72) Inventors: Chi-Chen Cheng, Taoyuan (TW); Darren Sng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 32 days.

(21) Appl. No.: 15/802,479

(22) Filed: Nov. 3, 2017

(65) Prior Publication Data
US 2018/0132287 A1    May 10, 2018

Related U.S. Application Data (60) Provisional application No. 62/417,331, filed on Nov. 4, 2016.

(51) Int. Cl.
*H04W 4/00* (2018.01)
*H04W 76/14* (2018.01)
(Continued)

(52) U.S. Cl.
CPC .............. *H04W 76/14* (2018.02); *H04W 4/70* (2018.02); *H04W 4/80* (2018.02); *H04W 12/003* (2019.01);
(Continued)

(58) Field of Classification Search
CPC ......... H04W 12/04; H04W 4/70; H04W 4/80; H04W 76/11; H04W 76/14
See application file for complete search history.

(56) References Cited

U.S. PATENT DOCUMENTS

2006/0094402 A1    5/2006  Kim
2009/0169018 A1*   7/2009  Deisher ............... H04L 63/0869
                                                           380/278
(Continued)

FOREIGN PATENT DOCUMENTS

CN    102461128    5/2012
CN    102710301    10/2012
(Continued)

OTHER PUBLICATIONS

Office Action of Taiwan Counterpart Application, dated Jun. 12, 2018, pp. 1-12.
(Continued)

*Primary Examiner* — Kevin C. Harper
*Assistant Examiner* — Derrick V Rose
(74) *Attorney, Agent, or Firm* — JCIPRNET (57) ABSTRACT

A method, an electronic apparatus, and a recording medium for establishing a wireless connection through vibration are provided. In the method, at least one nearby electronic apparatus is scanned by the first electronic apparatus. A pairing request is transmitted to the second electronic apparatus among the at least one nearby electronic apparatus by the first electronic apparatus. A pairing code is generated in response to receiving the pairing request and a vibration with a pattern in accordance with the pairing code is triggered by the second electronic apparatus. The vibration is detected and the pattern of the vibration is identified to obtain the pairing code by the first electronic apparatus. The obtained pairing code is transmitted to the second electronic apparatus by the first electronic apparatus. Finally, the pairing code is confirmed by the second electronic apparatus to establish the wireless connection with the first electronic apparatus.

17 Claims, 4 Drawing Sheets

(51) Int. Cl.
    *H04W 4/80*     (2018.01)
    *H04W 12/00*    (2009.01)
    *H04W 4/70*     (2018.01)
    *H04W 76/11*    (2018.01)

(52) U.S. Cl.
    CPC ...... *H04W 76/11* (2018.02); *H04W 12/00504* (2019.01)

(56) References Cited

U.S. PATENT DOCUMENTS

| | | | |
|---|---|---|---|
| 2012/0190299 A1* | 7/2012 | Takatsuka | H04B 5/00 455/41.1 |
| 2012/0198098 A1 | 8/2012 | Kim et al. | |
| 2013/0169526 A1 | 7/2013 | Gai et al. | |
| 2015/0198939 A1 | 7/2015 | Ander et al. | |
| 2018/0234846 A1* | 8/2018 | Tao | H04W 12/06 |

FOREIGN PATENT DOCUMENTS

| | | |
|---|---|---|
| CN | 103178875 | 6/2013 |
| CN | 103378881 | 10/2013 |

OTHER PUBLICATIONS

"Office Action of China Counterpart Application," dated Nov. 5, 2019, p. 1-p. 9.

* cited by examiner

METHOD, ELECTRONIC APPARATUS AND RECORDING MEDIUM FOR ESTABLISHING WIRELESS CONNECTION THROUGH VIBRATION

CROSS REFERENCE TO RELATED APPLICATION

This application claims the priority benefit of U.S. provisional application Ser. No. 62/417,331, filed on Nov. 4, 2016. The entirety of the above-mentioned patent application is hereby incorporated by reference herein and made a part of specification.

FIELD OF THE INVENTION

The application is directed to a communication method, and more particularly to a method and an electronic apparatus for establishing a wireless connection.

DESCRIPTION OF RELATED ART

Along with the development of technologies, electronic devices have become smaller and more powerful. Currently, miniature electronic device with various functions could be worn by a person without causing uncomfortableness, so it becomes more popular. In general, wearable devices are able to perform some basic functions, such as timekeeping, calculation, game-playing, and the like. Some of them are able to run applications, programs or even an operating system, such that those wearable devices are suitable being applied in healthcare, wireless communication, or fitness track.

Some of the wearable devices require to work in coordination with other electronic devices such as a mobile phone, a smart scale, or a tablet, and a connection with the electronic device is required to be established in advance.

SUMMARY

Since the wireless communication protocol such as Bluetooth requires authentication through entering a PIN code, the conventional connecting method may not be applied to the wearable devices due to lack of display or input tool.

The disclosure provides a method, an electronic apparatus, and a recording medium for establishing a wireless connection through vibration, capable of wirelessly connectioning wearable devices or other devices, especially the wearable device or other devices without display or input tool.

The disclosure provides a method for establishing a wireless connection with a second electronic apparatus through vibration, which is adapted to a first electronic apparatus. In the method, at least one nearby electronic apparatus is scanned. A pairing request is transmitted to the second electronic apparatus among the at least one nearby electronic apparatus. A vibration generated by the second electronic apparatus is detected, wherein the vibration is generated with a pattern in accordance with a pairing code generated in response to receiving the pairing request. The pattern of the vibration is identified to obtain the pairing code. The obtained pairing code is transmitted to the second electronic apparatus. A wireless connection with the second electronic apparatus is established after the pairing code is confirmed by the second electronic apparatus.

In an example of the disclosure, the step of scanning the at least one nearby electronic apparatus by the first electronic apparatus further comprises scanning the at least one nearby electronic apparatus in response to detecting a vibration with a specific pattern matched with one of at least one predetermined pattern, wherein the vibration is generated by the second electronic apparatus.

In an example of the disclosure, the specific pattern is the same as the pattern in accordance with the pairing code.

In an example of the disclosure, before the step of transmitting a pairing request to the second electronic apparatus among the at least one nearby electronic apparatus by the first electronic apparatus, the method further generates a device list comprising the at least one nearby electronic apparatus, and sequentially selects one of the at least one nearby electronic apparatus in the device list as the second electronic apparatus.

In an example of the disclosure, before the step of detecting the vibration and identifying the pattern of the vibration to obtain the pairing code by the first electronic apparatus, the method further comprises prompting a message requesting to place one of the first electronic apparatus and the second electronic apparatus on the other or place both the first electronic apparatus and the second electronic apparatus on a same medium capable of propagating the vibration.

In an example of the disclosure, the step of identifying the pattern of the vibration to obtain the pairing code by the first electronic apparatus comprises analyzing one or both of an amplitude graph and a frequency graph of the vibration to obtain the pairing code.

In an example of the disclosure, the step of transmitting the obtained pairing code to the second electronic apparatus by the first electronic apparatus further comprises encrypting the obtained pairing code with a public key and transmitting the encrypted pairing code to the second electronic apparatus through a communication channel preliminary established in the scanning step.

In an example of the disclosure, the step of confirming the pairing code to establish the wireless connection with the first electronic apparatus by the second electronic apparatus comprises exchanging data with each other by the first electronic apparatus and the second electronic apparatus, wherein the exchanged data is encrypted with a private key approved by the first electronic apparatus and the second electronic apparatus.

The disclosure provides an electronic apparatus for establishing a wireless connection through vibration, which includes a communication module, a sensing device, a storage device, and a processor. The communication module is configured to communicate with at least one nearby electronic apparatus. The sensing device is configured to detect a vibration. The storage device is configured to store programs. The processor is coupled to the communication module, the sensing device, and the storage device and configured to execute the programs in the storage device to perform following steps: scanning the at least one nearby electronic apparatus by using the communication module; transmitting a pairing request to a second electronic apparatus among the at least one nearby electronic apparatus by using the communication module; detecting the vibration generated by the second electronic apparatus by using the sensing device, wherein the vibration is generated with a pattern in accordance with a pairing code generated in response to receiving the pairing request; identifying the pattern of the vibration to obtain the pairing code; transmitting the obtained pairing code to the second electronic apparatus by using the communication module; and establishing a wireless connection with the second electronic apparatus by using the communication module after the second electronic apparatus confirms the pairing code.

In an example of the disclosure, the processor comprises scanning the at least one nearby electronic apparatus in response to the sensing device detecting a vibration with a specific pattern matched with one of at least one predetermined pattern, wherein the vibration is generated by the second electronic apparatus.

In an example of the disclosure, the specific pattern is the same as the pattern in accordance with the pairing code.

In an example of the disclosure, the processor comprises generating a device list comprising the at least one nearby electronic apparatus, and sequentially selecting one of the at least one nearby electronic apparatus in the device list as the second electronic apparatus.

In an example of the disclosure, the processor further prompts a message requesting to place one of the electronic apparatus and the second electronic apparatus on the other or place both the electronic apparatus and the second electronic apparatus on a same medium capable of propagating the vibration.

In an example of the disclosure, the processor comprises analyzing one or both of an amplitude graph and a frequency graph of the vibration to obtain the pairing code.

In an example of the disclosure, the processor comprises encrypting the obtained pairing code with a public key and transmitting the encrypted pairing code to the second electronic apparatus through a communication channel preliminary established by the communication module.

In an example of the disclosure, the processor comprises exchanging data with the second electronic apparatus through the wireless connection, wherein the exchanged data is encrypted with a private key approved by the electronic apparatus and the second electronic apparatus.

The disclosure provides a non-transitory recording medium for recording a computer program to be loaded by an electronic apparatus to execute steps of: scanning at least one nearby electronic apparatus; transmitting a pairing request to a second electronic apparatus among the at least one nearby electronic apparatus; detecting the vibration generated by the second electronic apparatus, wherein the vibration is generated with a pattern in accordance with a pairing code generated in response to receiving the pairing request; identifying the parttem of the vibration to obtain the pairing code; transmitting the obtained pairing code to the second electronic apparatus; and establishing a wireless connection with the second electronic apparatus after the second electronic apparatus confirms the pairing code.

To sum up, in the method, the electronic apparatus, and the recording medium for establishing a wireless connection through vibration, a pairing code adapted to a pairing process between two electronic apparatuses is transmitted through an alternative way (i.e. vibration) such that when establishing the wireless connection, one of the two electronic apparatuses may recognize the other electronic apparatus through identifying the pattern of the vibration generated thereby. As a result, even if the electronic apparatus is not equipped with a display or an input tool, the electronic apparatus can still be wirelessly connected to the other electronic apparatus without miscellaneous procedures.

In order to make the aforementioned and other features and advantages of the invention more comprehensible, several examples accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate exemplary examples of the disclosure and, together with the description, serve to explain the principles of the disclosure.

DESCRIPTION OF EXAMPLES

Reference will now be made in detail to the present exemplary examples of the disclosure, examples of which are illustrated in the accompanying drawings. Wherever possible, the same reference numbers are used in the drawings and the description to refer to the same or like parts.

In the present disclosure, a vibrator that is widely used in portable or wearable apparatus is adopted as a medium for pairing authentication. When receiving a pairing request from a pairing initiator, a pairing acceptor randomly generates a pairing code and accordingly generates a vibration by the vibrator with a pattern in accordance with the generated pairing code. In one example, the generated pairing code may be a default pairing code. The vibration pattern is detected by the pairing initiator through direct contact or through suitable medium such as a surface of a solid table and is detected by an accelerometer (i.e. another hardware component widely used in portable or wearable apparatus) disposed in the pairing initiator. The code inherent in the detected vibration is identified and sent back to the pairing acceptor for confirmation. Once the code is confirmed by the pairing acceptor, the pairing process is completed and a connection is established between the pairing initiator and the pairing acceptor. Accordingly, the connection between two devices may be established by simply placing one device on the other device.

Figure 1:
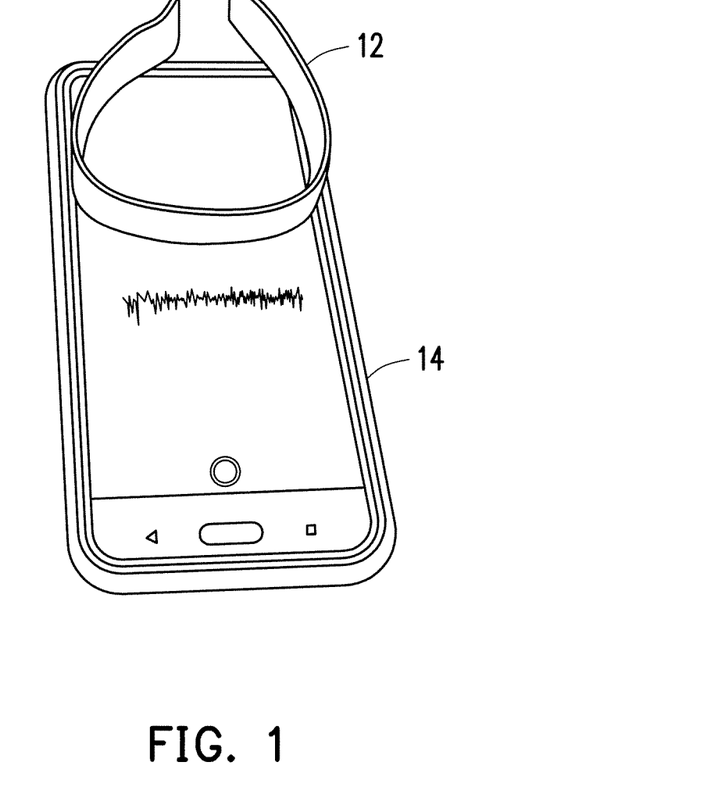
FIG. 1 is an example of a schematic diagram illustrating a method for establishing a wireless connection through a vibration according to an example of the present disclosure.

FIG. 1 is an example of a schematic diagram illustrating a method for establishing a wireless connection through a vibration according to an example of the present disclosure. Referring to FIG. 1, the smartphone 14 first activates a wireless communication module, such as Bluetooth or other wireless protocol, to scan nearby devices and accordingly finds a smart band 12. The smartphone 14 then sends a pairing request to the smart band 12 to enable the smart band 12 to trigger a vibration in a specific pattern repeatedly. The vibration pattern is detected by the smartphone 14 through the direct contact, for example the smart band 12 is placed on a smartphone 14 as shown in FIG. 1, or effectively sensing the vibration via solid medium (e.g. concrete surface like hard wood desk) and a monitoring software of an accelerometer disposed in smartphone 14 is executed to identify a code inherent in the vibration, for example, according to vibration amplitude, vibration frequencies, and/or vibration duration time of vibration detected by the accelerometer. In an example, the vibration amplitude, vibration frequention, and/or vibration duration time of vibration detected by the accelerometer and/or other sensors for detecting motion of the smartphone 14 may be shown on a display of the smartphone 14. In another example, the amplitude graph, vibration frequention, and/or vibration duration time may be transformed and shown as a pattern, a serial digital code, or other format according to the detected amplitude graph. Finally, the smartphone 14 transmits the identified code to the smart band 12 for confirmation and authentication, and accordingly establishes a wireless connection with the smart band 12.

Figure 2:
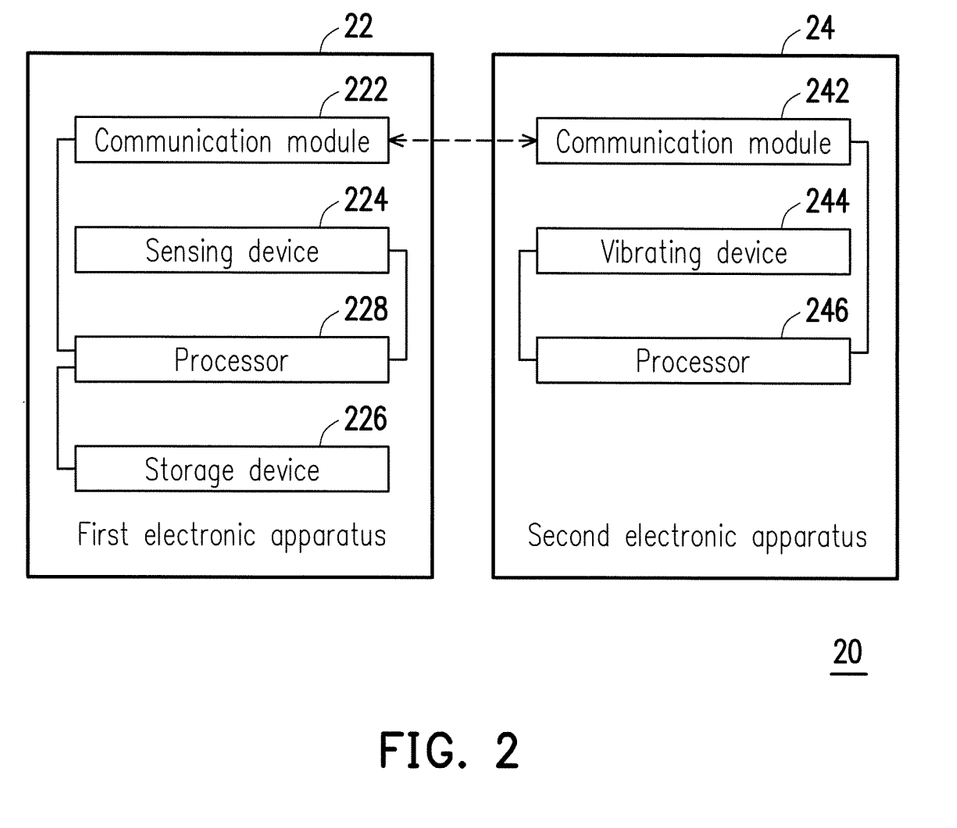
FIG. 2 is a block diagram illustrating a system for establishing a wireless connection through a vibration according to an example of the present disclosure.

In detail, FIG. 2 is a block diagram illustrating a system for establishing a wireless connection through a vibration according to an example of the present disclosure. Referring to FIG. 2, the system 20 for establishing the wireless connection of the present example includes a first electronic apparatus 22 and a second first electronic apparatus 24. In one example, the first electronic apparatus 22 may be implemented in a form of the smartphone 14 as shown in FIG. 1, and the second electronic apparatus 24 may be implemented in a form of the smart band 12 as shown in FIG. 1. However, in other examples, the first electronic apparatus 22 may also be a personal digital assistant (PDA), a tablet, a laptop, a smart scale, or any other kind of portable device, which is not limited to the present example. The second electronic apparatus 24 may also be a wearable device implemented in a form of a heart rate band, a glass, an earphone, a helmet, a mask, a necklace, a ring, a bracelet, a clothes, a belt, a clip, or a shoe, etc., capable of being worn by a user, which is also not limited to the present example. The first electronic apparatus 22 includes a communication module 222, a sensing device 224, a storage device 226, and a processor 228, and the second electronic apparatus 24 includes a communication module 242, a vibrating device 244, and a processor 246. Functions of aforesaid devices are respectively described below.

The communication device 222 and the communication device 242 may respectively be a wireless communication device for communicating with each other, and may support but not limited to at least one of the following wireless transmission techniques: global system for mobile communication (GSM), personal handy-phone system (PHS), general packet radio service (GPRS), code division multiple access (CDMA), wideband code division multiple access (WCDMA), wireless fidelity (Wi-Fi), worldwide interoperability for microwave access (WiMAX), long term evolution (LTE), Bluetooth, Bluetooth low energy (BLE), infrared rays (IR), Radio frequency identification (RFID), or near-field communication (NFC).

The sensing device 224 may be an acceleration sensor, a gravity sensor (G sensor) or any other sensor which can detect vibration of the first electronic apparatus 22, but is not limited thereto.

The storage device 226 is, for example, one or a combination of stationary or movable random access memory (RAM), read-only memory (ROM), flash memory, hard disk, or any other similar device, and which records programs that can be executed by the processor 228. The storage device 226 may further store pairing information of the electronic apparatus that have established the wireless connection with the first electronic apparatus 22.

The vibrating device 244 is a vibration motor such as a coil vibration motor, a cylindrical vibration motor, or another type of vibration motor or any device that cable of generating vibration that is capable of being accommodated in a casing of the second electronic apparatus, and vibration amplitude, vibration frequency, and/or vibration duration time of the vibration generated by the vibrating device 244 may be controlled by the processor 246. In one example, the vibrating device 244 may also be a loudspeaker capable of generating a vibration accompanied with the creation of sound, which is not limited in the present example.

The processor 228 and the processor 246 may respectively be, for example, a central processing unit (CPU), a programmable microprocessor for general purpose or special purpose, a digital signal processor (DSP), a programmable controller, an application specific integrated circuits (ASIC), or any other similar device, or a combination of the above devices. The processor 228 and the processor 246 are used for executing programs to perform the method for establishing a wireless connection through a vibration as illustrated in the present disclosure.

Figure 3:
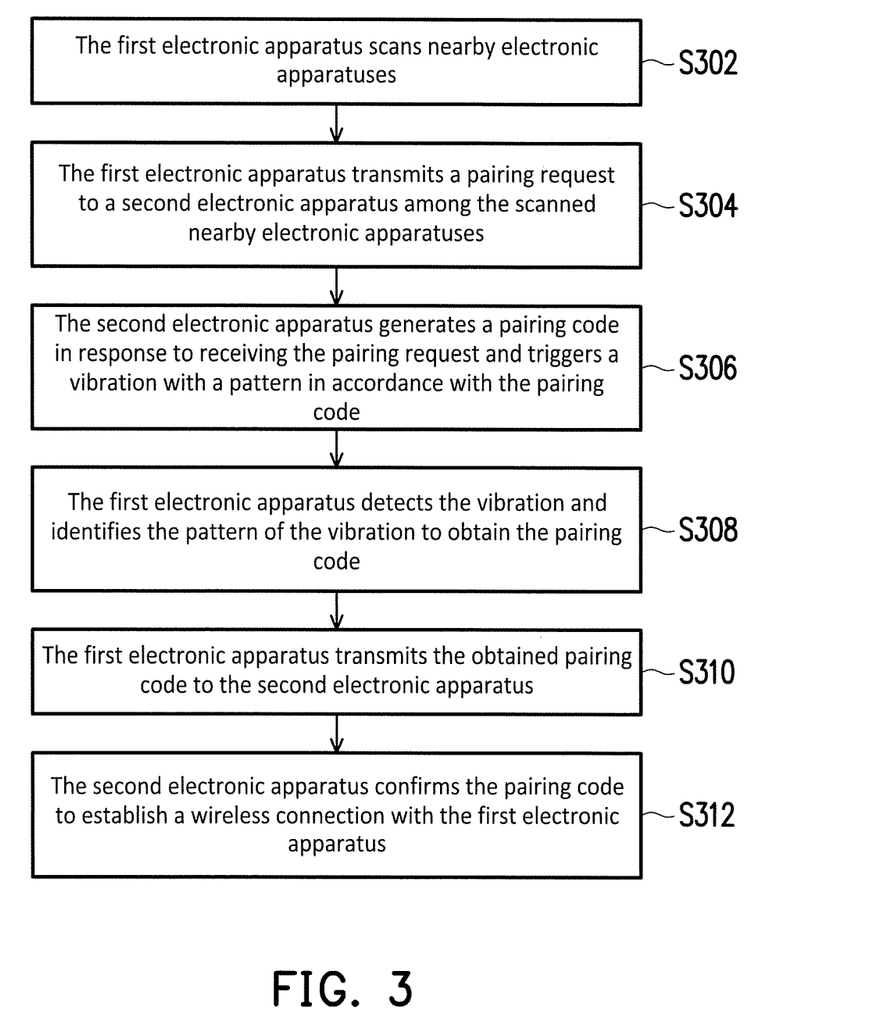
FIG. 3 is a flowchart illustrating a method for establishing a wireless connection through a vibration according to an example of the disclosure.

FIG. 3 is a flowchart illustrating a method for establishing a wireless connection through a vibration according to an example of the disclosure. Referring to FIGS. 2 and 3, the method of the present example is applicable to the system 20 illustrated in FIG. 2 and detailed steps of the method will be described below with reference to each element of the system 20.

First, the first electronic apparatus 22 scans nearby electronic apparatuses (step S302). In detail, to start the pairing process, the user may activate the communication module 242 of the second electronic apparatus 24 to place the second electronic apparatus 24 in a discoverable mode capable of being discovered by other electronic apparatuses and further activate the communication module 222 of the first electronic apparatus 24 to place the first electronic apparatus 24 in a scan mode capable of scanning the electronic apparatuses nearby the first electronic apparatus 22. The electronic apparatuses located within a scan range of the communication module 222 may be detected and shown as a device list on a display (not shown) of the first electronic apparatus 22. In one example, the radio frequency (RF) power of the first electronic apparatus 22 will be controlled to limit the scanning range of scanning nearby devices.

Next, the first electronic apparatus 22 transmits a pairing request to the second electronic apparatus 24 among the scanned nearby electronic apparatuses (step S304). In detail, in one example, the user may select the second electronic apparatus 24 as a target for pairing from the scanned device list shown on the display of the first electronic apparatus 22. In another example, the processor 228 of the first electronic apparatus 22 may automatically select the second electronic apparatus 24 for pairing from the scanned device list sequentially. In yet another example, the processor 228 may simply select all the electronic apparatuses in the device list for pairing. The processor 228 of the first electronic apparatus 22 may transmit the pairing request to the selected electronic apparatuses through a communication channel preliminarily established by the the communication module 242 in the scanning process.

The second electronic apparatus 24 generates a pairing code in response to receiving the pairing request and triggers a vibration with a pattern in accordance with the pairing code (step S306). In detail, in response to receiving the pairing request transmitted by the first electronic apparatus 22, the processor 246 of the second electronic apparatus 24 may randomly generate a number and use the same as the pairing code to determine the pattern of the vibration, and finally drive the vibrating device 244 to generate the vibration with the determined pattern.

It is noted that, before pairing, the first electronic apparatus 22 and/or the second electronic apparatus 24 may prompt a message requesting the user to place the second electronic apparatus 24 on the first electronic apparatus 22, or vice versa, to make a physically contact or place the first electronic apparatus 22 and the second electronic apparatus 24 on a same platform or object such that the first electronic apparatus 22 may sense the vibration generated by the vibrating device 244 of the second electronic apparatus 24 by the sensing device 224 directally or indirectly.

The first electronic apparatus 22 then detects the vibration and identifies the pattern of the vibration to obtain the pairing code (step S308). In detail, the processor 228 of the first electronic apparatus 22 may detect the vibration of the first electronic apparatus 22 by the sensing device 224 and then identifies the pattern of the vibration by analyzing an amplitude graph, a frequency graph, and/or a duration of time graph of the vibration so as to obtain the pairing code according to a predetermined standard or rule.

The first electronic apparatus 22 transmits the obtained pairing code to the second electronic apparatus 24 (step S310). In detail, the processor 228 of the first electronic apparatus 22 may transmit the pairing code encrypted with a public key or without encryption through the communication channel preliminarily established by the communication module 222.

Finally, the second electronic apparatus 24 confirms the pairing code to establish a wireless connection with the first electronic apparatus 22 (step S312). In detail, the processor 246 of the second electronic apparatus 24 may receive the pairing code transmitted from the first electronic apparatus 22 by the communication module 242 and then compares the received pairing code with the pairing code generated thereby. Once the pairing codes are matched, the processor 246 confirms that the first electronic apparatus 22 transmitting the pairing code is the target for connection and therefore establishes the wireless connection with the first electronic apparatus 22 by the communication module 242. After the wireless connection is established, the first electronic apparatus 22 and the second electronic apparatus 24 may exchange data with each other in which the data may be encrypted with a private key approved by both sides, so as to provide a secured way for data transmission.

It is noted that once the wireless connection is established between the first electronic apparatus 22 and the second electronic apparatus 24, the processor 228 may further store the pairing information such as a service set identifier (SSID), a device ID, or a pairing code of the second electronic apparatus 24 in the storage device 226 such that next time when the second electronic apparatus 24 is located within the range of the communication module 222, the first electronic apparatus 22 may automatically establish the wireless connection with the second electronic apparatus 24 without going through the pairing process.

It is also noted that, in aforesaid example, the establishment of wireless connection is triggered by initiating the scanning procedure on the first electronic apparatus which is referred to as the pairing initiator. However, in another example, the establishment may also be triggered by the second electronic apparatus. For example, in the case shown in FIG. 1, the user first activates the smartphone 14 so as to trigger the establishment of wireless connection with the smart band 12. However, since the user connecting the smart band 12 is most likely he wants to use it, the establishment may be triggered at the instance that the user activates the smart band 12. That is, the smart band 12 may trigger a vibration immediately after being activated by the user and the vibration may be generated with a specific pattern that is capable of being recognized by the smartphone 14 such that whenever the user places the smart band 12 which is vibrating on the smartphone 14, the smartphone 14 may recognize the specific pattern and then automatically trigger the procedures for establishing the wireless connection as illustrated in the foregoing example.

Figure 4:
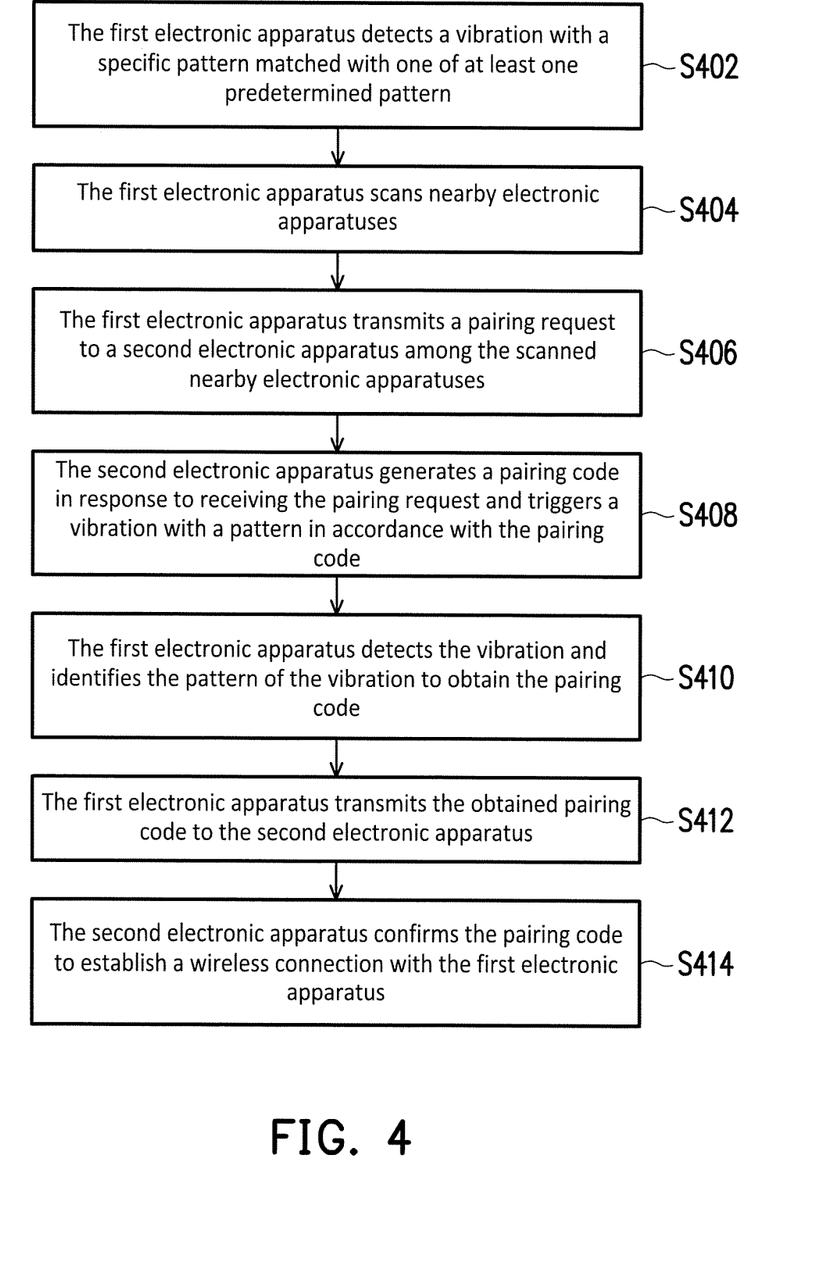
FIG. 4 is a flowchart illustrating a method for establishing a wireless connection through a vibration according to an example of the disclosure.

In detail, FIG. 4 is a flowchart illustrating a method for establishing a wireless connection through a vibration according to an example of the disclosure. Referring to FIGS. 2 and 4, the method of the present example is applicable to the system 20 illustrated in FIG. 2 and detailed steps of the method will be described below with reference to each element of the system 20.

First, the first electronic apparatus 22 detects a vibration with a specific pattern matched with one of at least one predetermined pattern by using the sensing device 224, wherein the vibration is generated by the second electronic apparatus 24 (step S402). In detail, since the sensing device 224 of the first electronic apparatus 22, for example a G-sensor, always works after the first electronic apparatus 22 is powered on, any vibration generated around would be instantly detected by the first electronic apparatus 22. Based on the predetermined patterns of vibration stored in the storage device 226 in advance, the first electronic apparatus 22 may recognize the vibration with the specific pattern by matching the detected pattern with the stored predetermined patterns. The predetermined patterns may be embodied or encoded with information of the electronic apparatus to be paired such as a brand, a SSID, a device ID, a serial number of the electronic apparatus, which are not limited in the present example.

In response to detecting the vibration with the specific pattern matched with one predetermined pattern, the first electronic apparatus 22 scans nearby electronic apparatuses by using the communication module 222 (step S404), and then transmits a pairing request to the second electronic apparatus 24 among the scanned nearby electronic apparatuses (step S406). Steps S404 and S406 described above are the same as or similar to steps S302 and S304 of the preceding example and thus, detailed contents are not repeated herein.

In response to receiving the pairing request, the second electronic apparatus 24 may generate a pairing code and trigger a vibration with a pattern in accordance with the pairing code (step S408). It is noted, in one example, the pattern of the vibration generated in accordance with the pairing code may be different from the specific pattern of the vibration generated when the user activates the second electronic apparatus 24. However, in another example, the pattern in accordance with the pairing code may be the same as the specific pattern. That is to say, after being activated by the user, the second electronic apparatus 24 may keep generating the vibration with the specific pattern by using the vibrating device 244 until the pairing process is completed, which is not limited in the present example.

The first electronic apparatus 22 then detects the vibration and identifies the pattern of the vibration to obtain the pairing code (step S410), and transmits the obtained pairing code to the second electronic apparatus 24 (step S412). Finally, the second electronic apparatus 24 confirms the pairing code to establish a wireless connection with the first electronic apparatus 22 (step S414). Steps S410 to S414 described above are the same as or similar to steps S308 to S312 of the preceding example and thus, detailed contents are not repeated herein.

Based on the above, the user may simply activate the second electronic apparatus 24 (e.g. a wearable device) and place it on the first electronic apparatus 22 (e.g. a mobile phone), and then the two apparatuses will automatically connect with each other after a few seconds. As a result, a convenient and secured way to connect two apparatus is achieved.

The present application further provides a recording medium, which records a computer program for executing various steps of the method described above. The computer program is composed of a plurality of code snippets (for example, an organization chart establishment code snippet, a form approval code snippet, a settings code snippet, and a deployment code snippet). After these code snippets are loaded into an electronic apparatus and executed by the same, the steps of the method described above can be accomplished.

Based on the above, in the method, the electronic apparatus, and recording medium for establishing a wireless connection through a vibration, a vibration with a special pattern is used as a pairing reference to identify the electronic apparatus to be connected. Accordingly, two electronic apparatuses can be automtacilly paired and connected by simply placing one on the other or placing the two together on a same platform. As a result, an easy and convenient way for establishing a wireless connection may be accomplished with existing components of the electronic apparatuses.

Although the disclosure has been described with reference to the above examples, it will be apparent to one of the ordinary skill in the art that modifications to the described example may be made without departing from the spirit of the disclosure. Accordingly, the scope of the disclosure will be defined by the attached claims not by the above detailed descriptions.

What is claimed is:

1. A method for establishing a wireless connection with a second electronic apparatus through vibration, adapted to a first electronic apparatus, wherein the first electronic apparatus is a smartphone, the method comprising:
    the first electronic apparatus scanning at least one nearby electronic apparatus;
    the first electronic apparatus transmitting a pairing request to the second electronic apparatus among the at least one nearby electronic apparatus, wherein the second electronic apparatus is a wearable smart band;
    the first electronic apparatus detecting a vibration generated by the second electronic apparatus, wherein the vibration is generated by the second electronic apparatus with a pattern in accordance with a first pairing code generated in response to receiving the pairing request transmitted from the first electronic apparatus;
    the first electronic apparatus identifying the pattern of the vibration to obtain a second pairing code in accordance with the identified pattern of the vibration;
    the first electronic apparatus transmitting the obtained second pairing code to the second electronic apparatus; and
    the first electronic apparatus establishing a wireless connection with the second electronic apparatus after the second pairing code transmitted from the first electronic apparatus matching the first pairing code is confirmed by the second electronic apparatus.

2. The method as claimed in claim 1, wherein the step of the first electronic apparatus scanning the at least one nearby electronic apparatus further comprises:
    scanning the at least one nearby electronic apparatus in response to detecting a vibration with a specific pattern matched with one of at least one predetermined pattern, wherein the vibration is generated by the second electronic apparatus.

3. The method as claimed in claim 2, wherein the specific pattern is the same as the pattern in accordance with the first pairing code.

4. The method as claimed in claim 1, wherein before the step of the first electronic apparatus transmitting the pairing request to the second electronic apparatus among the at least one nearby electronic apparatus, the method further comprises:
    generating a device list comprising the at least one nearby electronic apparatus; and
    sequentially selecting one of the at least one nearby electronic apparatus in the device list as the second electronic apparatus.

5. The method as claimed in claim 1, wherein before the steps of the first electronic apparatus detecting the vibration and identifying the pattern of the vibration to obtain the second pairing code, the method further comprises:
    prompting a message requesting to place one of the first electronic apparatus and the second electronic apparatus on the other, place the first electronic apparatus on the second electronic apparatus, place the second electronic apparatus on the first electronic apparatus, or place both the first electronic apparatus and the second electronic apparatus on a same medium capable of propagating the vibration.

6. The method as claimed in claim 1, wherein the step of the first electronic apparatus identifying the pattern of the vibration to obtain the second pairing code comprises:
    analyzing one or more of vibration amplitude, vibration frequencies, vibration duration time of the vibration to obtain the second pairing code.

7. The method as claimed in claim 1, wherein the step of the first electronic apparatus transmitting the obtained second pairing code to the second electronic apparatus further comprises:
    encrypting the obtained second pairing code with a public key and transmitting the encrypted second pairing code to the second electronic apparatus through a communication channel preliminary established in the scanning step.

8. The method as claimed in claim 1, wherein the step of the first electronic apparatus establishing a wireless connection with the second electronic apparatus after the second pairing code transmitted from the first electronic apparatus matching the first pairing code is confirmed by the second electronic apparatus comprises:
    exchanging data with the second electronic apparatus, wherein the exchanged data is encrypted with a private key approved by the first electronic apparatus and the second electronic apparatus.

9. An electronic apparatus for establishing a wireless connection through vibration, wherein the electronic apparatus is a smartphone and comprises:
    a transceiver, communicating with at least one nearby electronic apparatus;
    a sensing device, detecting a vibration;
    a storage device, storing programs; and
    a processor, coupled to the transceiver, the sensing device, and the storage device and configured to execute the programs in the storage device to perform:
        scanning the at least one nearby electronic apparatus by using the transceiver;
        transmitting a pairing request to a second electronic apparatus among the at least one nearby electronic apparatus by using the transceiver, wherein the second electronic apparatus is a wearable smart band;

detecting the vibration generated by the second electronic apparatus by using the sensing device, wherein the vibration is generated by the second electronic apparatus with a pattern in accordance with a first pairing code generated in response to receiving the pairing request transmitted from the electronic apparatus;

identifying the pattern of the vibration to obtain a second pairing code in accordance with the identified pattern of the vibration;

transmitting the obtained second pairing code to the second electronic apparatus by using the transceiver; and establishing a wireless connection with the second electronic apparatus by using the transceiver after the second pairing code transmitted from the first electronic apparatus matching the first pairing code is confirmed by the second electronic apparatus.

10. The electronic apparatus as claimed in claim 9, wherein the processor comprises scanning the at least one nearby electronic apparatus in response to the sensing device detecting a vibration with a specific pattern matched with one of at least one predetermined pattern, wherein the vibration is generated by the second electronic apparatus.

11. The electronic apparatus as claimed in claim 10, wherein the specific pattern is the same as the pattern in accordance with the first pairing code.

12. The electronic apparatus as claimed in claim 10, wherein the processor comprises generating a device list comprising the at least one nearby electronic apparatus, and sequentially selecting one of the at least one nearby electronic apparatus in the device list as the second electronic apparatus.

13. The electronic apparatus as claimed in claim 10, wherein the processor further prompts a message requesting to place one of the electronic apparatus and the second electronic apparatus on the other, place the electronic apparatus on the second electronic apparatus, place the second electronic apparatus on the electronic apparatus, or place both the electronic apparatus and the second electronic apparatus on a same medium capable of propagating the vibration.

14. The electronic apparatus as claimed in claim 10, wherein the processor comprises analyzing one or more of vibration amplitude, vibration frequencies, vibration duration time of the vibration to obtain the second pairing code.

15. The electronic apparatus as claimed in claim 10, wherein the processor comprises encrypting the obtained second pairing code with a public key and transmitting the encrypted second pairing code to the second electronic apparatus through a communication channel preliminary established by the communication module.

16. The electronic apparatus as claimed in claim 10, wherein the processor comprises exchanging data with the second electronic apparatus through the wireless connection, wherein the exchanged data is encrypted with a private key approved by the electronic apparatus and the second electronic apparatus.

17. A non-transitory computer readable recording medium, configured to record a program, wherein the program is loaded by an electronic apparatus to execute following steps:

scanning at least one nearby electronic apparatus;

transmitting a pairing request to a second electronic apparatus among the at least one nearby electronic apparatus;

detecting the vibration generated by the second electronic apparatus, wherein the vibration is generated by the second electronic apparatus with a pattern in accordance with a first pairing code generated in response to receiving the pairing request transmitted from the electronic apparatus;

identifying the pattern of the vibration to obtain a second pairing code in accordance with the identified pattern of the vibration;

transmitting the obtained second pairing code to the second electronic apparatus; and establishing a wireless connection with the second electronic apparatus after the second pairing code transmitted from the first electronic apparatus matching the first pairing code is confirmed by the second electronic apparatus, wherein the electronic apparatus is a smartphone and the second electronic apparatus is a wearable smart band.

* * * * *